United States Patent [19]

Riganati et al.

[11] 4,083,035

[45] Apr. 4, 1978

[54] BINARY IMAGE MINUTIAE DETECTOR

[75] Inventors: John P. Riganati, Yorba Linda; Visvaldis A. Vitols, Orange, both of Calif.

[73] Assignee: Rockwell International Corporation, El Segundo, Calif.

[21] Appl. No.: 722,307

[22] Filed: Sep. 10, 1976

[51] Int. Cl.² .............................................. G06K 9/12
[52] U.S. Cl. ............................................... 340/146.3 E
[58] Field of Search ................ 340/146.3 E, 146.3 H, 340/146.3 MA, 146.3 AE

[56] References Cited

U.S. PATENT DOCUMENTS

| | | | |
|---|---|---|---|
| 3,582,889 | 6/1971 | Bodez | 340/146.3 E |
| 3,611,290 | 10/1971 | Luisi et al. | 340/146.3 E |
| 3,723,970 | 3/1973 | Stoller | 340/146.3 MA |
| 3,846,754 | 11/1974 | Oka et al. | 340/146.3 H |
| 3,859,633 | 1/1975 | Ho et al. | 340/146.3 E |
| 3,968,475 | 7/1976 | McMahon | 340/146.3 E |
| 4,003,024 | 1/1977 | Riganati et al. | 340/146.3 H |
| 4,015,240 | 3/1977 | Swonger et al. | 340/146.3 E |

OTHER PUBLICATIONS

Eleccion, "Automatic Fingerprint Identification", *IEEE Spectrum*, Sept. 1973, vol. 10, pp. 36-45.
Rao et al., "An Automatic Fingerprint Classification System," 2nd Int. Joint Congress on Pattern Rec., Copenhagen, Denmark, Aug., 1974, pp. 180-184.
Kobayashi et al., "Automated Fingerprint Classifier", *2nd Int. Joint Congress on Pattern Rec.*, Copenhagen, Denmark, Aug. 1974, pp. 185-189.

*Primary Examiner*—Leo H. Boudreau
*Attorney, Agent, or Firm*—H. Fredrick Hamann; Rolf M. Pitts; George Jameson

[57] ABSTRACT

An apparatus is described for detecting minutiae in a two-dimensional binary image. In a preferred embodiment a two-dimensional binary data bit stream of an image is enhanced in an enhancement circuit by pore-fill and line-thin operations. The enhanced binary data bit stream is then applied in parallel to first and second detectors which detect minutiae and extract the X, Y and $\theta$ coordinates of each minutiae detected in the enhanced binary data bit stream.

6 Claims, 8 Drawing Figures

RIDGE ENDINGS

| 0 0 1 | 0 1 0 | 1 0 0 | 0 0 0 |
| 0 1 0 | 0 1 0 | 0 1 0 | 0 1 1 |
| 0 0 0 | 0 0 0 | 0 0 0 | 0 0 0 |

000010001    000010010    000010100    000011000

| 0 0 0 | 0 0 0 | 0 0 0 | 0 0 0 |
| 1 1 0 | 0 1 0 | 0 1 0 | 0 1 0 |
| 0 0 0 | 0 0 1 | 0 1 0 | 1 0 0 |

000110000    001010000    010010000    100010000

BIFURCATIONS

| 0 1 0 | 1 0 1 | 0 0 1 | 0 1 0 |
| 1 1 1 | 0 1 0 | 1 1 0 | 1 1 0 |
| 0 0 0 | 0 0 1 | 0 0 1 | 0 0 1 |

000111010    001010101    001110001    001110010

| 1 0 1 | 0 1 0 | 1 0 0 | 0 0 1 |
| 0 1 0 | 0 1 1 | 0 1 1 | 1 1 0 |
| 0 1 0 | 0 1 0 | 0 1 0 | 0 1 0 |

010010101    010011010    010011100    010110001

| 0 1 0 | 0 0 0 | 1 0 1 | 0 1 0 |
| 1 1 0 | 1 1 1 | 0 1 0 | 0 1 1 |
| 0 1 0 | 0 1 0 | 1 0 0 | 1 0 0 |

010110010    010111000    100010101    100011010

| 1 0 0 | 0 0 1 | 0 1 0 | 1 0 0 |
| 0 1 1 | 0 1 0 | 0 1 0 | 0 1 0 |
| 1 0 0 | 1 0 1 | 1 0 1 | 1 0 1 |

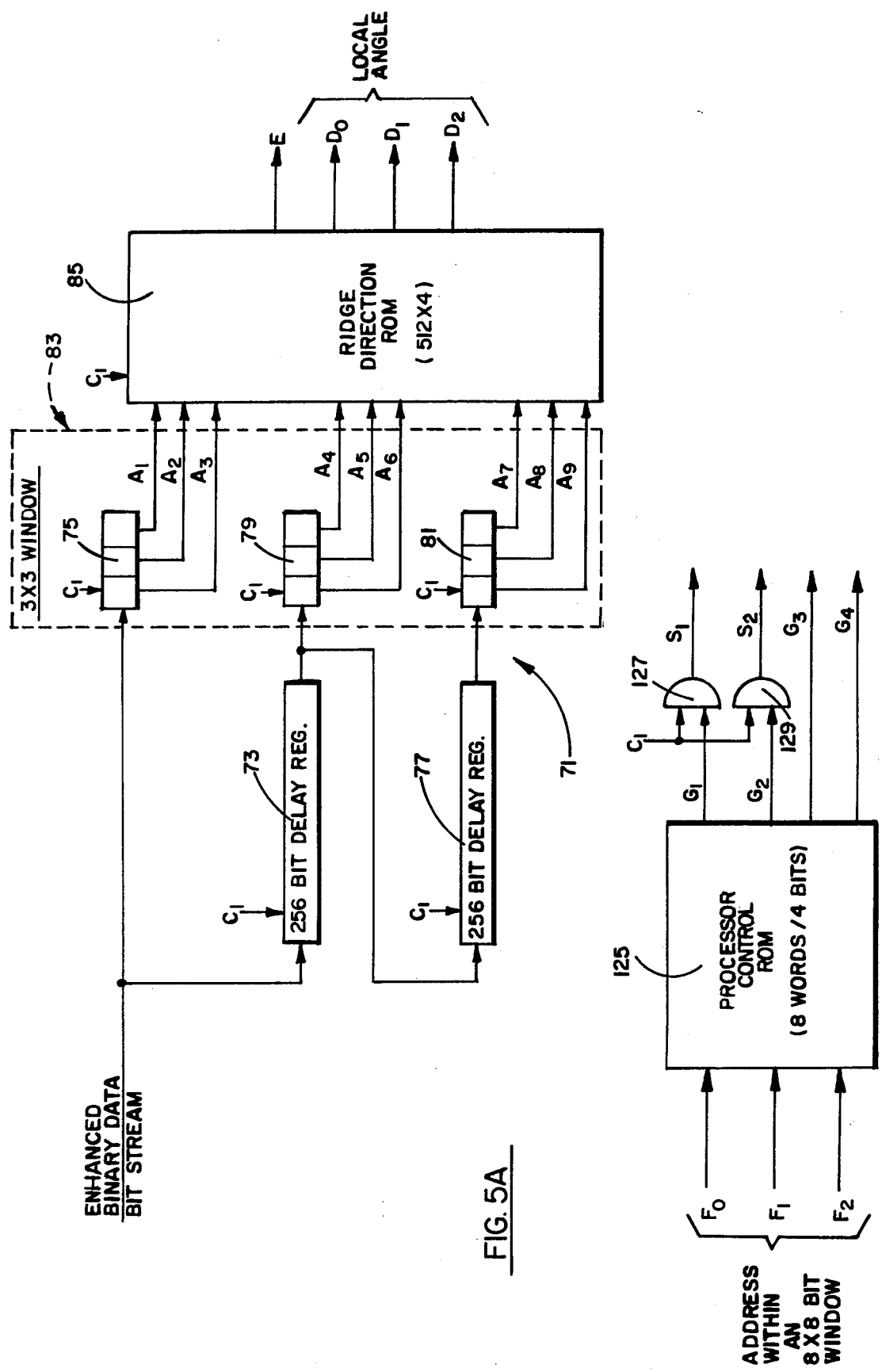

FIG. 6

| 3×3 WINDOW CONTENTS | ROM ADDRESS $A_9 A_8 A_7 A_6 A_5 A_4 A_3 A_2 A_1$ | E | $D_2$ | $D_1$ | $D_0$ |
|---|---|---|---|---|---|
| 010 / 010 / 010 | 0 1 0 0 1 0 0 1 0 | 1 | 0 | 0 | 0 |
| 010 / 010 / 100 | 0 1 0 0 1 0 0 0 1 | 1 | 0 | 0 | 1 |
| 001 / 010 / 010 | 1 0 0 0 1 0 0 1 0 | 1 | 0 | 0 | 1 |
| 001 / 010 / 100 | 1 0 0 0 1 0 0 0 1 | 1 | 0 | 1 | 0 |
| 001 / 110 / 000 | 1 0 0 0 1 1 0 0 0 | 1 | 0 | 1 | 1 |
| 000 / 011 / 100 | 0 0 0 1 1 0 0 0 1 | 1 | 0 | 1 | 1 |
| 000 / 111 / 000 | 0 0 0 1 1 1 0 0 0 | 1 | 1 | 0 | 0 |
| 100 / 011 / 000 | 0 0 1 1 1 0 0 0 0 | 1 | 1 | 0 | 1 |
| 000 / 110 / 001 | 0 0 0 0 1 1 1 0 0 | 1 | 1 | 0 | 1 |
| 100 / 010 / 001 | 0 0 1 0 1 0 1 0 0 | 1 | 1 | 1 | 0 |
| 010 / 010 / 001 | 0 1 0 0 1 0 1 0 0 | 1 | 1 | 1 | 1 |
| 100 / 010 / 010 | 0 0 1 0 1 0 0 1 0 | 1 | 1 | 1 | 1 |
| ALL OTHER ADDRESSES | | 0 | 0 | 0 | 0 |

BINARY IMAGE MINUTIAE DETECTOR

BACKGROUND OF THE INVENTION

1. Field of the Invention

This invention relates to pattern recognition and more particularly to the detection of minutiae in a binary image of, for example, a fingerprint.

2. Description of the Prior Art

The mushrooming of the various criminal activities in our present-day society has forced the various law enforcement agencies in the United States, as well as in other countries of the world, to encourage the development of automatic fingerprint readers. In response to this need, various types of automatic fingerprint readers have been proposed. Many of the automatic fingerprint readers that have been recently proposed are based upon the detection and location of ridge endings and bifurcations in the fingerprint. These ridge endings and bifurcations, which define the fine features of a fingerprint, are called minutiae. It is believed by many fingerprint experts that such minutiae-based fingerprint readers offer the best means of obtaining a positive identification.

Since the automatic detection of specified minutiae is basically a problem in pattern recognition, it would appear to be a simple matter to provide an automatic system for the detection of such minutiae. However, the recognition of these minutiae is complicated by several factors, such as: (1) the specified minutiae occur at arbitrary orientations; (2) there are variations in ridge breadth and distance between ridge centers; (3) there are various inherent defects in all fingerprints, such as scars, warts, etc.; (4) false ridge endings appear at the boundaries of fingerprints and scars; and (5) the quality of fingerprints varies widely with respect to contrast and clarity. As a result, in almost all cases, the proposed fingerprint reader has either been too complex, too inefficient or inoperative.

For example, it has been proposed to use a large scale computer to control the scan of a fingerprint along some predetermined pattern and to store the resulting complex electrical signal. Subsequently, in order to identify a fingerprint, the fingerprint would have to be scanned and the resultant complex electrical signal compared with those in the memory banks of the computer. Although this approach may well be operative, it has the inherent disadvantage of all mass data-processing systems, and that is the requirement for enormous amounts of complex and costly equipment.

Another suggested approach has been to use holographic techniques whereby two fingerprints may be matched or the location of specified minutiae on fingerprints identified by simultaneously illuminating an unknown fingerprint and a known mask with coherent laser light and determining the locations of a match. However, apparently because of the complexity and the minute detail present in typical fingerprints, it has not been possible to make such a system which operates reliably.

U.S. Pat. No. 3,050,711 to Harmon uses a cathode ray scanner and places transducer elements about a plurality of circles to obtain scans for character recognition.

U.S. Pat. No. 3,859,633 to Ho et al. is directed to a system for detecting minutiae (bifurcations and ridge endings) in a fingerprint pattern. A fingerprint is scanned by a TV camera to produce a corresponding video signal. The video signal is fed into an enhancer circuit which serves to improve the contrast between ridges and valleys of the fingerprint pattern. No specific circuitry is shown for the enhancer circuit and it is also stated that the enhancer circuit comprises no part of the Ho et al. invention. The enhanced video signals are converted to binary signals by a digitizer, which samples the enhanced video signal at a 1 MHz rate, corresponding to a matrix of 350 × 262 sampled points representative of the scanned print. The binary signals from the digitizer are fed to parallel continuity logic networks which are monitored to determine the existence and coordinates of minutiae. These continuity logic networks form "conductive paths corresponding to the contrast between ridges and valleys". Each continuity logic network cmprises a source of potential (+V) at the center of a 12 × 12 matrix. The +V source functions as a continuity signal. Each matrix point is a logic circuit which functions to generate an output upon the coincidence of a signal from its corresponding storage location in an associated shift register and a signal from one of the four matrix points located adjacent and orthogonal to it.

U.S. Pat. No. 3,611,290 to Luisi is directed to a fingerprint minutiae reading device which automatically detects the location of ridge endings and bifurcations and correspondingly codes them in terms of X, Y and $\theta$ coordinates. A flying spot scanner is employed to sequentially scan and sample small portions of the fingerprint pattern to derive an electrical analog signal indicative of the pattern at that sampled portion of the fingerprint. The flying spot scanner includes a photomultiplier which produces the electrical analog signal. A quantizer is coupled to the output of the photomultiplier for transforming the electrical analog signal to a digital signal. A plurality of shift registers receives the digital signal output from the quantizer to temporarily store each sampled portion of the fingerprint. This digital representation of the sampled portion of the fingerprint is circulated through the shift registers and transferred to a decision logic circuit. If the decision logic circuit determines that the sampled portion corresponds to minutia (ridge ending or bifurcation) it generates a signal indicating detection of a minutia and correspondingly codes the detected minutia in X, Y and $\theta$ coordinates.

U.S. Pat. No. 3,699,519 to Campbell discloses an apparatus for scanning live fingerprints with a flying spot scanner and detecting the X, Y location of each minutia (ridge ending or bifurcation) and its $\theta$ orientation. The logic circuitry for determining the location and orientation of each minutia is the same as that found in U.S. Pat. No. 3,611,290, cited above. The Campbell patent disclosure and claims are directed specifically to an apparatus for determining the characteristics of a fingerprint pattern utilizing a cathode ray spot scanner wherein the scanning pattern at each coordinate location is a plurality of successive polar scans having polar radii of different magnitudes for scanning the plurality of portions at each coordinate location.

U.S. Pat. No. 3,537,070 to Malek discloses a scanner which is adapted to scan succeeding portions of a pattern such as a fingerprint. During each scan of the (fingerprint) pattern, the distance between adjacent segments (ridges) of the (fingerprint) pattern is monitored and a signal generated when this distance is either greater than normal by a predetermined factor or drops below a predetermined threshold. A determination is similarly made as to the width of each segment (ridge)

and a signal generated when the width of a segment is greater than normal by a predetermined factor or when it drops below a predetermined threshold. The signals that are derived are applied to a circuit which analyzes signals from several succeeding scans and recognizes various predetermined characteristics (ridges) of the (fingerprint) pattern.

None of the above-described systems teaches or suggests an apparatus which comprises: a first circuit for enhancing two-dimensional binary data with various pore-fill, and line-thin operations; a second circuit responsive to the enhanced binary data for detecting minutiae and providing the X and Y coordinates of the detected minutiae by processing predetermined minutiae patterns detected in a first preselected window of the second circuit; and a third circuit responsive to the enhanced binary data for providing the orientation angles of the detected minutiae by processing line patterns detected in a second preselected window.

SUMMARY OF THE INVENTION

Briefly, an apparatus is provided for detecting the positions (X and V) and orientation angle ($\theta$) of minutiae in a two-dimensional binary data bit stream of an image. The binary data bit stream of the image is enhanced in an enhancement circuit by various preselected pore-fill and line-thin operations. The enhanced binary data bit stream is parallel-applied to a minutia position detector and to a minutia orientation detector. The minutia position detector detects a minutia and develops the associated X and Y coordinates of that minutia whenever any preselected minutia pattern is sensed within a first $3 \times 3$ bit window which effectively scans the enhanced binary image. The minutia orientation detector develops local ridge angle data whenever any preselected local angle pattern is sensed in a second $3 \times 3$ bit window which effectively scans the enhanced binary image. The minutia orientation detector obtains the vector average of all local angles present in each of a plurality of $8 \times 8$ bit windows across the image. This vector average of all of the local angles within a given $8 \times 8$ bit window is the orientation angle $\theta$ for each minutia that is positioned within that given $8 \times 8$ bit window.

Although the embodiment of the present invention is directed to an apparatus for detecting minutiae in patterns such as fingerprints, it is apparent that similar characteristics or features can be extracted from other types of patterns. For example, similar characteristics or features can be defined and extracted from optical characters (such as letters and numbers), speech and sound patterns, and many types of contour patterns including those developed in conjunction with geographical mapping, structure analysis and wave study.

It is therefore an object of this invention to provide an improved binary image minutiae detector.

Another object of this invention is to provide a binary image minutiae detector which is both simple and interative.

Another object of this invention is to provide an automatic minutiae reader which may be employed wherever patterns can be uniquely represented by characteristics and features similar to minutiae.

Another object of this invention is to provide an apparatus for detecting specified patterns in a binary image.

Another object of this invention is to provide an improved fingerprint minutiae reading apparatus.

Another object of this invention is to provide a binary image minutiae detector which can consistently and repeatably detect the minutiae angles of a pattern, such as a fingerprint, over different impressions of the same finger.

A further object of the invention is to provide an apparatus for detecting the position and orientation of specified minutiae in patterns such as fingerprints.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 4 illustrates examples of address patterns corresponding to the detection of minutiae in the 3 bit $\times$ 3 bit window of FIG. 3.

FIGS. 5A, 5B and 5C, in combination, illustrate a block diagram of the minutia orientation detector of FIG. 1.

FIG. 6 illustrates various address patterns corresponding to ridge flow directions detected in the 3 bit $\times$ 3 bit window of FIG. 5A.

DESCRIPTION OF THE PREFERRED EMBODIMENT

Figure 1:
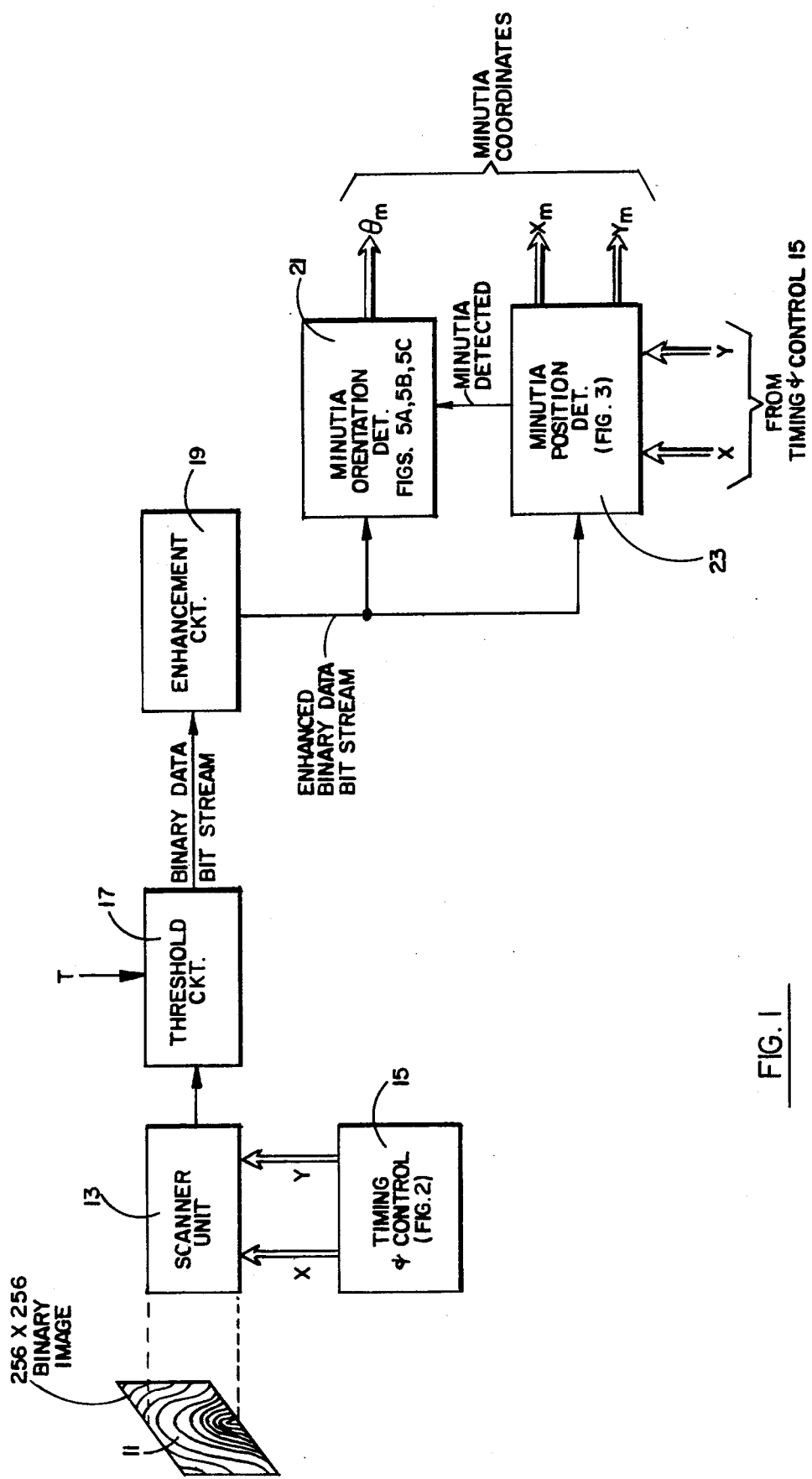
FIG. 1 is a simplified block diagram of a preferred embodiment of the invention.

Referring now to the drawings, FIG. 1 discloses a simplified block diagram of a preferred embodiment of the binary image minutiae detector of the invention. A pattern image 11 of, for example, a fingerprint or other optical character is applied to a scanner unit 13. A timing and control circuit 15 sequentially applies different X and Y addresses or address counts to the scanner unit 13. In response to these different X and Y address counts, the scanner unit 13 scans incremental positions or locations of the fingerprint image 11 in a typical raster pattern. Such a raster pattern can comprise, for example, $2^{16}$ (or 65,536) incremental locations, with $2^8$ (or 256) increments along each line in an X direction and $2^8$ lines or increments in a Y direction. The incremental positions or locations of the X and Y coordinates of the scan are developed by the X and Y address counts of the timing and control circuit 15.

From raster-scanning the exemplary $2^{16}$ incremental locations of the image 11, the scanner unit 13 sequentially develops a series of sampled data signals at its output. However, these sampled data signals are actually analog data signals which may vary from a pure black signal (equivalent to a binary "1") to a pure white signal (equivalent to a binary "0"). It should be noted that a pure white signal usually only occurs in the bright background areas bounding the fingerprint pattern area of the image 11. The sampled data signals are sequentially fed to a threshold circuit 17 which quantizes each of the sampled data to either a binary "1" or a binary "0" state. All data signals which are equal to or exceed the value of a preselected threshold signal T are quantized to binary "1" signals, while all other data signals are quantized to binary "0" signals. Thus, the output of the threshold circuit 17 is a binary data bit stream, wherein each binary "1" signal corresponds to a black signal and each binary "0" signal corresponds to a white signal. Also, this binary data bit stream is comprised of two-dimensional binary data derived from the two-dimensional pattern image 11.

The binary data bit stream from the threshold circuit 17 is enhanced by an enhancement circuit 19, which performs pore fill and line thin operations on the data to remove undesirable variations in the pattern without changing the essence of the pattern being processed. The enhancement circuit 19 fills pores which appear in the ridge pattern and may cause discontinuities. In addition, the enhancement circuit 19 thins the ridges of the pattern until no further changes occur in the pattern, i.e. the widths of the ridges are no more than one bit wide. In one exemplary implementation of the enhancement circuit 19, one pore-fill and five line-thin circuits could be utilized to perform these fill and thin operations on this binary data. The circuitry for performing these fill and thin operations on this binary data is similar to that found in commonly assigned, U.S. Pat. No. 4,0003,024, entitled: "A Two-Dimensional Binary Data Enhancement System", and is incorporated herein by reference.

This enhanced data bit stream from the enhancement circuit 19 is still two-dimensional binary data because of the bits in the bit stream is still related to the overall pattern of the other bits in the bit stream. The enhanced binary data bit stream is applied to a minutia orientation detector 21 and to a minutia position detector 23. The X and Y address counts from the timing and control circuit 15 are also applied to the minutia position detector 23. The detector 23 analyzes each pattern of the enhanced binary data bit stream that appears in a window (to be explained) to determine whether or not a minutia is present in the window. Whenever the detector 23 detects the presence of a minutia pattern in the window, it generates a "minutia detected" signal. This minutia detected signal internally enables the detector 23 to pass the X and Y addresses, which are being developed by the circuit 15 at that time, to its output as the $X_M$ and $Y_M$ coordinates of the detected minutia. In addition, the minutia detected signal enables the minutia orientation detector 21 to develop at its output the orientation angle $\theta_M$ that is associated with the $X_M$ and $Y_M$ coordinates of the detected minutia. The $X_M$, $Y_M$ and $\theta_M$ signals collectively form the minutia coordinates for each detected minutia.

Figure 2:
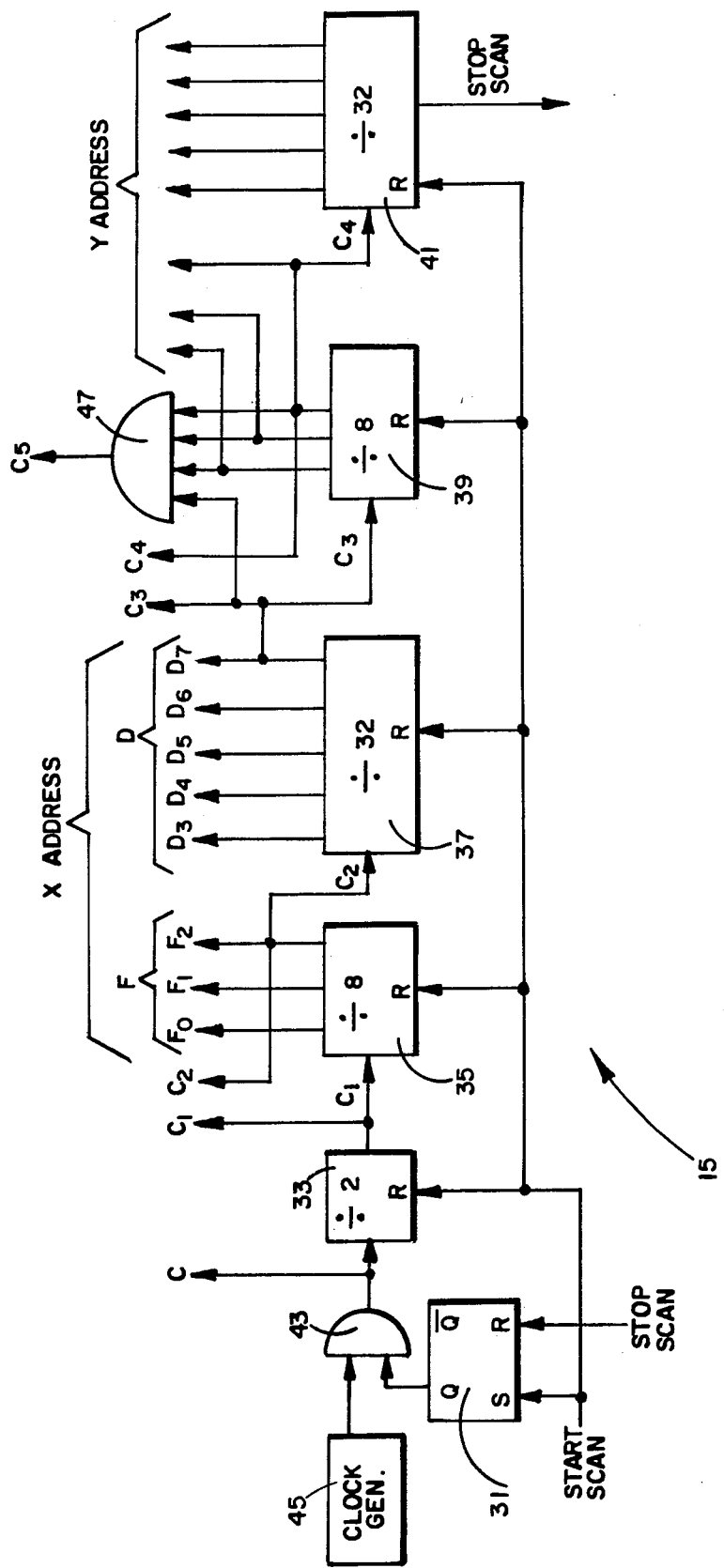
FIG. 2 is a block diagram of the timing and control circuit of FIG. 1.

Referring now to FIG. 2, a detailed block diagram of the timing and control circuit 15 of FIG. 1 is illustrated. A start scan signal from, for example, an external source (not shown) such as a push button initiates the operation of the circuit 15 and, hence, of the apparatus of FIG. 1. More specifically, this start scan signal sets a flip flop 31, and resets serially coupled ÷ 2 (divide by two), ÷ 8, ÷ 32, ÷ 8 and ÷ 32 countdown circuits 33, 35, 37, 39 and 41 to zero outputs.

When set, the output of the flip flop 31 enables an AND gate 43 to pass clock pulses C from a clock generator 45 to the sequence of countdown circuits 33, 35, 37, 39 and 41 to develop various clock pulses and clocking signals for controlling the operation of the apparatus of FIG. 1. Clock pulses C, $C_1$, $C_2$, $C_3$ and $C_4$ are respectively developed at the outputs of AND gate 43 and countdown circuits 33, 35, 37 and 39. Clock pulse $C_5$ is developed by AND gating in an AND gate 47 the $C_3$ clock with the three clocking signals from the countdown circuit 39.

A 3-bit signal F, comprised of clocking signals $F_0$, $F_1$ and $F_2$, is developed by the countdown circuit 35. Similarly, a 5-bit signal D, comprised of clocking signals $D_3$, $D_4$, $D_5$, $D_6$ and $D_7$, is developed by the countdown circuit 37. Together the countdown circuits 35 and 37 form an 8-bit counter for counting 256 $C_1$ clocks to develop the 256 X addresses or incremental (bit) positions along each line being scanned by the scanner unit 13. In other words, the 256 different X addresses for each line scan are derived by incrementing the combination of the F and D signals with the $C_1$ clocks. After the 256 addresses or address counts for each line are developed, a carry bit or $C_3$ clock is developed at the output of the countdown circuit 37 and applied to the input of the countdown circuit 39. The countdown circuits 39 and 41 combine to form an 8-bit counter for counting these $C_3$ clocks to develop the 256 Y addresses or lines in the raster scan of scanner unit 13 (FIG. 1). Thus, the 256 X-positions in a new line are scanned after the count of the circuits 39 and 41 is incremented by a $C_3$ clock pulse. After 256 different Y address counts or complete lines have been scanned along the Y-axis, the counter comprised of the circuits 39 and 41 causes a stop scan signal to be developed at the output of the countdown circuit 41. This stop scan signal resets the flip flop 31 to terminate the raster scan of the image 11 by disabling the AND gate 43, thereby preventing any more C clocks from being counted down by the circuits 33, 35, 37, 39 and 41.

The minutia position detector circuit 23 of FIG. 1 will now be discussed in detail by referring to its block diagram illustrated in FIG. 3. Basically, the function of the minutia position detector 23 is to indicate when a minutia has been detected (by generating a "minutia detected" signal) and give the coordinates in X and Y of that detected minutia.

Figure 3:
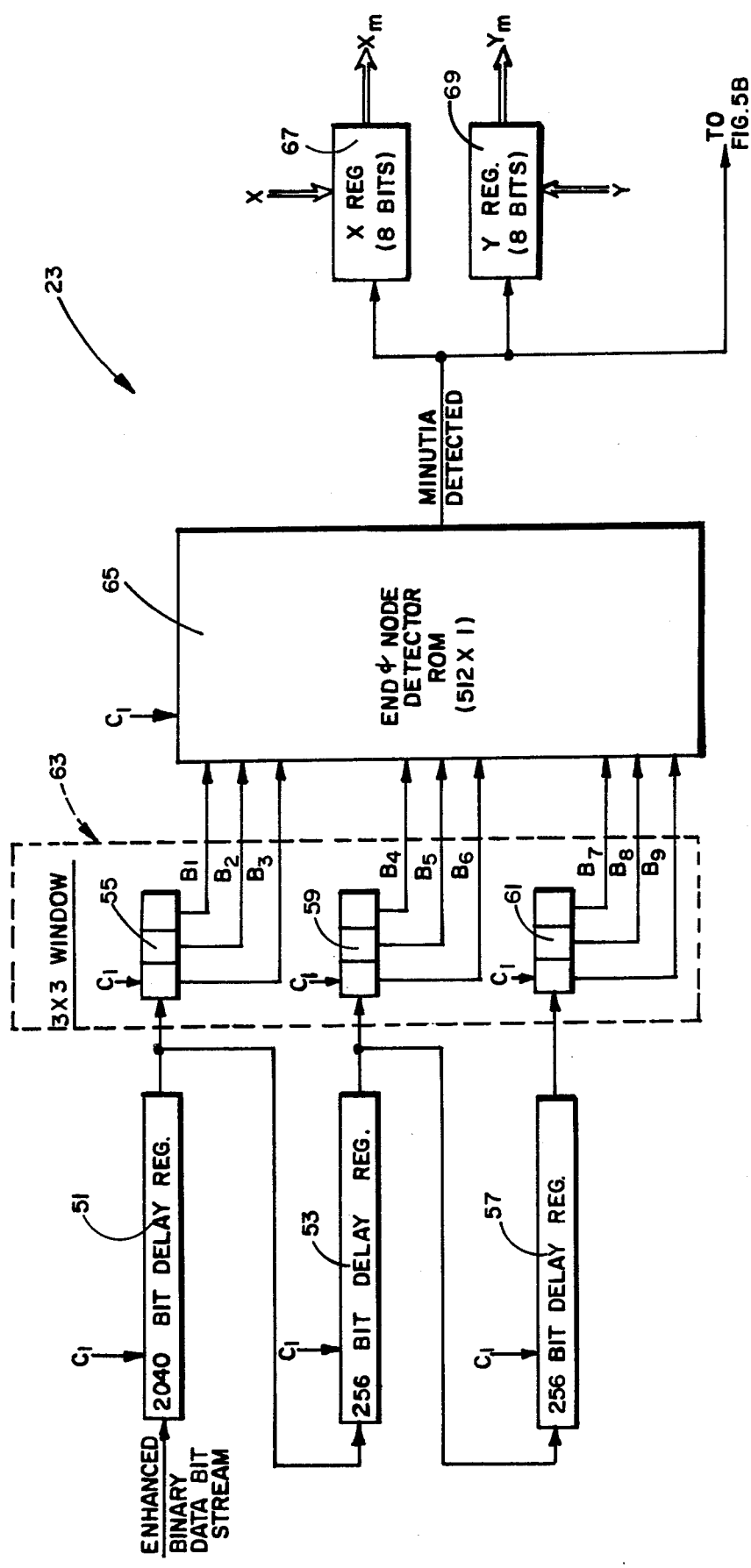
FIG. 3 is a block diagram of the minutia position detector of FIG. 1.

In FIG. 3, the enhanced binary data bit stream from the enhancement circuit 19 (FIG. 1) is delayed by a 2040 bit delay register 51 before being commonly applied to a 256-bit delay register 53 and to a first 3-bit serial-in/parallel-out register 55. The 2040 bit delay of the register 51 corresponds to a delay of 8 lines (at 256 bits per line) minus 8 bits. Such a 2040-bit delay is utilized in the minutia position detector 23 because the minutia orientation detector 21 (FIG. 1) takes approximately 2040 more bit times to develop its $\theta_M$ output than the minutia position detector 23 takes to develop its $X_M$ and $Y_M$ outputs. By means of this delay compensation, the associated minutia coordinates $\theta_M$, $X_M$ and $Y_M$ for a detected minutia are developed in coincidence by the detectors 21 and 23.

The output of the register 53 is fed to a 256-bit delay register 57 and to a second 3-bit serial-in/parallel-out register 59. The output of the register 57 is fed to a third 3-bit serial-in/parallel-out register 61. The three 3-bit registers 55, 59 and 61 form a 3 × 3 (3 by 3) bit scanning window 63 which scans by 9-bit sampled areas of the delayed enhanced binary data at the output of the delay register 51 one bit at a time. The window 63 therefore contains bit stream information corresponding to a 9-bit sample of three adjacent bits per line on three adjacent lines. Timed with the $C_1$ clock pulses, the 3 × 3 window 63 effectively scans along the fingerprint pattern one bit by one bit to the end of the line, shifts to the next line and scans along that line.

The nine parallel output address signals $B_1$–$B_9$ from the window 63 are fed to an end and node detector 65, which is illustrated as being a 512 bit × 1 bit read only memory (ROM). The ROM 65 is internally programmed to detect minutiae in the form of ridge endings (ends) and bifurcations (nodes). However, it should be realized that, if so desired, the ROM 65 could also be programmed to detect minutiae other than ridge endings and bifurcations. In this instant case, the ROM 65 is programmed so that if a minutia is present and centered in the 3 × 3 window 63, the address signals $B_1 - B_9$ correspond to a minutia address. Each possible address, which corresponds to a detected minutia in any position, causes the ROM 65 to develop a binary "1" "minutia detected" signal which is used to enable registers 67 and 69 to store the X and Y coordinates of that detected minutia. It will be recalled that these X and Y coordinates or addresses are developed by the timing and control circuit 15 (FIG. 2).

FIG. 4 illustrates 24 different patterns, with each pattern indicating the presence of a minutia when that pattern appears in the 3 × 3 window 63 formed by the registers 55, 59 and 61 of FIG. 3. More particularly, each of the upper 8 patterns indicate that a ridge ending is present in the window 63 while each of the lower 16 patterns indicates that a bifurcation is present in the window 63. Furthermore, it can be seen in all of these 24 patterns of FIG. 4 that, when either a ridge ending or bifurcation is centered in the 3 × 3 window 63, a binary "1" signal is located at the center bit ($B_5$) location of the register 59. It is the pattern surrounding that binary "1" signal in the $B_5$ location that determines whether or not a ridge ending or bifurcation is present in the window 63.

A corresponding address is derived from each of the 24 patterns of FIG. 4. Each address, which is in the form $B_9 B_8 B_7 B_6 B_5 B_4 B_3 B_2 B_1$, is shown directly beneath its corresponding pattern in FIG. 4. Each of these 24 addresses enables the ROM 65 to read out the binary "1" "minutia detected" signal from an associated one of the 512 address locations in the ROM 65. The remaining 488 of the 512 address locations in the ROM 65 store binary "0" signals to indicate that the associated patterns contain no ridge endings or bifurcations.

Figure 5B:
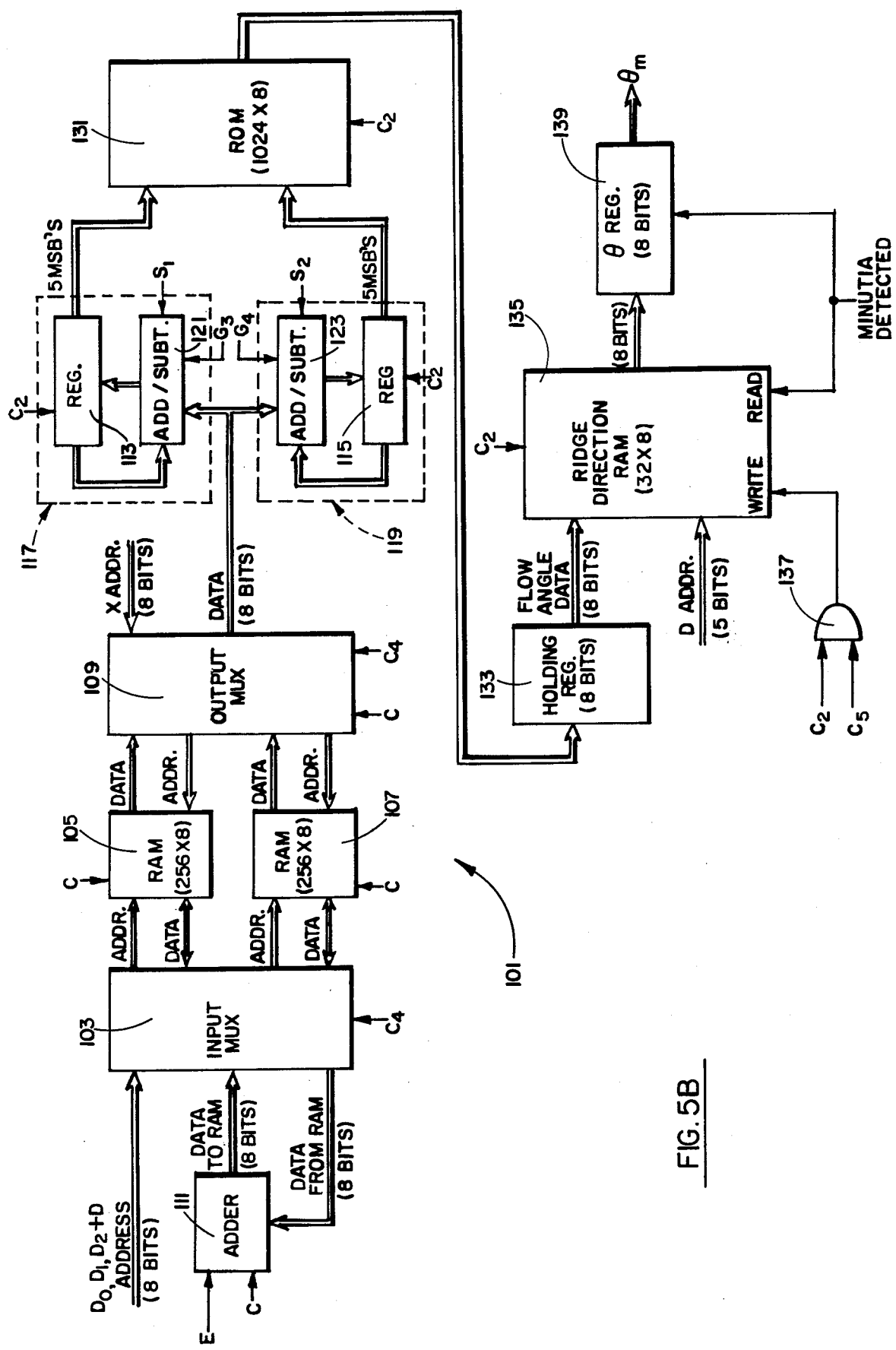

The detailed block diagram of the minutia orientation detector 21 of FIG. 1 is shown in FIGS. 5A, 5B and 5C. FIG. 5A illustrates a coarse ridge angle data circuit 71, which is responsive to the enhanced binary data bit stream for developing coarse (or local) ridge angle data signals $D_0 D_1 D_2$, as well as an enable bit or signal E. The enhanced binary data bit stream from the enhancement circuit 19 (FIG. 1) is applied to a 256-bit delay register 73 and to a first 3-bit serial-in/parallel-out register 75. The output of the register 73 is fed to a 256-bit delay register 77 and to a second 3-bit serial-in/parallel-out register 79. The output of the register 77 is fed to a third 3-bit serial-in/parallel-out register 81. The three 3-bit registers 75, 79 and 81 form a 3 × 3 bit window 83 which scans by 9-bit sampled areas of the enhanced binary data one bit at a time. The window 83 therefore contains bit stream information corresponding to 9-bit sample of three adjacent bits per line on three adjacent lines. The $C_1$ clocks are applied to the registers 73, 75, 77, 79 and 81 to enable the 3 × 3 window 83 to effectively scan along the fingerprint pattern one bit by one bit to the end of a line and then shift to the next line and scan along that line.

In structure and operation the registers 73, 75, 77, 79 and 81 of FIG. 5A are similar to the registers 53, 55, 57, 59 and 61 of FIG. 3. However, the enhanced binary data bit stream is directly applied to the registers 73 and 75, in FIG. 5A, whereas the enhanced binary data bit stream in FIG. 3 is delayed by 2040 bit times (by register 51) before it is applied to the registers 53 and 55.

The nine parallel output address signals $A_1–A_9$ from the 3 × 3 window 83 are applied to a 512 × 4 ridge direction ROM 85. The ROM 85 is programmed to read out a specific local angle in accordance with one of 12 different addresses.

The twelve different addresses, which symbolize the various ridge flows through the 3 × 3 window 83, are shown in FIG. 6. As seen in FIG. 6, 12 different patterns of a single line extending through the 3 × 3 window 83 result in 12 different addresses. Each line is formed by the position of the 1's in the pattern, and is either a straight line or a slightly curved line which passes through the center bit position ($A_5$) of the window 83. Each address, which is in the form $A_9 A_8 A_7 A_6 A_5 A_4 A_3 A_2 A_1$, is shown adjacent to its associated pattern in FIG. 6.

Although the twelve illustrated patterns are all different, the same angle value indications can be respectively derived from four pairs of these patterns. As a result, the local angle values read out from the ROM 85 only total 8 different angle indications. Any other patterns, which may appear in the 3 × 3 window 83, are ignored for purposes of identifying ridge flow information and, accordingly, 0's (zeros) are read out from these unprogrammed address locations of the ROM 85. The 12 selected angle values, corresponding to 12 addresses to the ROM 85 (subject to ± 180° as to four thereof), result in 8 coded angle values ($D_0 D_1 D_2$), An output enable bit or signal E is developed by the ROM 85, along with one of the 8 local angle values (as determined by the binary states of the $D_0$, $D_1$ and $D_2$ bits), whenever the ROM 85 is addressed by one of the 12 addresses illustrated in FIG. 6. The enable signal E indicates that a line is passing through the center bit position ($A_5$) of the window 83, while the associated coded angle value $D_0 D_1 D_2$ indicates which one of 8 directions this line is passing through.

Referring now to FIG. 5B, a block diagram of a ridge direction averager 101 of the minutia orientation detector 21 (FIG. 1) is shown. The clock pulses C, $C_2$, $C_4$ and $C_5$ and the clocking signals $F_0-F_2$ (F) and $D_3-D_7$ (D) of FIG. 2, as well as the 3-bit local angle $D_0-D_2$ from the ROM 85 of FIG. 5A, are utilized, as shown, in the operation of the circuit of FIG. 5B.

The local angle signals $D_0-D_2$ and the clocking signals $D_3-D_7$ combine to supply an 8-bit address to an input multiplexer (MUX) 103, which alternately applies said 8-bit $D_0-D_7$ address to either a 256 byte random access memory (RAM) 105 or a 256 byte RAM 107 during alternate $C_4$ clock pulse intervals. By this means, as will be explained below, data is selectively read out of addressed storage areas of a RAM, updated by an associated enable bit E and restored or written back into the RAM at the addressed location.

An output multiplexer (MUX) 109 operates in alternate time frames with the input multiplexer 103 such that data is read out of, updated and written back into the RAM 105 from the multiplexer 103 while data is read out of the RAM 107 by the multiplexer 109 for processing. Likewise, data is accessed from, updated and written back into the RAM 107 while data stored in the RAM 105 is read out and processed. This multiplexing technique is used since the processing rate is much faster than the rate at which data storage occurs in the RAMs 105 and 107 and, hence, adequate time is available for the alternating function provided by the multiplexers 103 and 109.

It should be noted at this time that 8 complete lines of the image 11 are scanned during each $C_4$ clock pulse interval. As a consequence, each of the RAMs 105 and 107 is implemented to store 256 bytes (8 bits/byte) of information over 8 scanned lines, or 32 8 × 8 bit window locations across a given line scan (256 bits) of the image 11. Each 8 × 8 window is represented by 8 words, each word being 8 bits in length, wherein each of the 8 words represents one of the 8 possible local angles ($D_0$–$D_2$) that can be developed by the ROM 85 (FIG. 5A). The $D_3$–$D_7$ portions of the $D_0$–$D_7$ address to the input multiplexer 103 determines which of these 32 8 × 8 windows is being addressed across a given line scan (256 bits) of the image 11.

In operation, assume that the input multiplexer 103 is applying the $D_0$–$D_7$ address to the RAM 105 during a given $C_4$ clock pulse interval. Whenever a local angle ($D_0$–$D_2$) is developed by the ROM 85 to form the first part of the $D_0$–$D_7$ address, the binary "1" enable bit E is applied to an adder 111. At the same time the 8-bit address $D_0$–$D_7$ is applied through the input multiplexer 103 to cause the RAM 105 to apply the data contents in its addressed location to the adder 111. The adder 111 adds the binary "1" enable bit E to said addressed data contents and applies the incremented data contents through the input multiplexer 103 to the input of the RAM 105. The input incremented data contents are then stored or written back into the addressed location of the RAM 105. Conversely, when no local angle is developed by the ROM 85, the enable bit E is a binary "0" and $D_0$, $D_1$ and $D_2$ are all zeros ($D_0 D_1 D_2$ = 000). As a result, the data contents in the location 000 $D_3 D_4 D_5 D_6 D_7$ of the RAM 105 remain unchanged. In this manner, the sum of all of the binary "1" E bits that occur within the same 8 × 8 window and have the same local angle is stored in the same location in the RAM 105.

Each of the RAMs 105 and 107, when fully loaded with data from the input multiplexer 103, ultimately stores a count value of the number of occurrences of each of the local angles ($D_0$–$D_2$) defined by the output of the ridge direction ROM 85 for each of the 32 8 × 8 bit windows. As indicated before, these 8 × 8 bit windows are fixed windows which occupy predetermined 8 bit × 8 bit portions across 8 horizontal lines of the total scan array. This is in contrast to the 3 bit × 3 bit window 83 of FIG. 5A (or even to the 3 bit × 3 bit window 63 of FIG. 3), which scans over the entire image on bit by one bit. Therefore, the ultimate objective of the minutia orientation detector 21 (FIG. 1) is to read the local angle information derived by the scanning of the 3 × 3 bit window 83 and process it to produce a single angle value which is an average of the ridge lines present in the 8 × 8 bit window. The accumulation of the number of occurrences of each of the 8 possible local angles within the 8 × 8 bit window provides a basis for achieving a weighted average of those local angles in deriving the orientation angle $\theta$ for that particular 8 × 8 bit window. Whereas, each 3 × 3 bit window pattern of FIG. 6. represents the local angle of a single scanned ridge line, the 8 × 8 bit window represents an orientation angle value comprising the vector average of a number of ridge lines which may be present in that 8 × 8 bit window, as will be described below.

The contents of each of the RAMs 105 and 107 represents 32 8 × 8 bit windows, with each 8 × 8 bit window being represented by eight 8-bit long words which, in turn, respectively represent histogram counts of the 8 possible local angles in each window. To process the contents of one of these RAMs, the F ($F_0 F_1 F_2$) and D ($D_3 D_4 D_5 D_6 D_7$) signals are combined to form the X address. This X address is applied to the output multiplexer 109 to access each group of 8 angles for each of the 32 windows in sequence. For each 8 × 8 bit window (as determined by the states of the D signals), the corresponding 8 angles are accessed by incrementing through the F signals and accumulating the results in registers 113 and 115 of accumulators 117 and 119, respectively. The accumulator 117 is comprised of the register 113 and an adder/subtractor circuit 121, and the accumulator 119 is comprised of the register 115 and an adder/subtractor circuit 123.

The function of the accumulators 117 and 119 is to get an approximate average of the sine and cosine projection of the average vector direction of all of the local angles detected in an 8 × 8 bit window. The averaging operation is under the control of a processor control ROM 125 shown in FIG. 5C. The ROM 125 is addressed by the clocking signals $F_0$, $F_1$ and $F_2$, which increment through the addresses for the eight possible local angles ($D_0$–$D_2$). In response to the addresses produced by the clocking signals $F_0$, $F_1$ and $F_2$, the processor control ROM 125 develops the $G_1$, $G_2$, $G_3$ and $G_4$ outputs shown in Table 1 below.

TABLE 1

| PROCESSOR CONTROL ROM 125 | | | | | | |
|---|---|---|---|---|---|---|
| ADDRESS | | | OUTPUTS | | | |
| $F_2$ | $F_1$ | $F_0$ | $G_1$ | $G_2$ | $G_3$ | $G_4$ |
| 0 | 0 | 0 | 0 | 1 | 0 | 1 |
| 0 | 0 | 1 | 1 | 1 | 1 | 1 |
| 0 | 1 | 0 | 1 | 0 | 1 | 0 |
| 0 | 1 | 1 | 1 | 1 | 1 | 0 |
| 1 | 0 | 0 | 0 | 1 | 0 | 0 |
| 1 | 0 | 1 | 1 | 1 | 0 | 0 |
| 1 | 1 | 0 | 1 | 0 | 0 | 0 |
| 1 | 1 | 1 | 1 | 1 | 0 | 1 |

The output bits $G_3$ and $G_4$ control the adder/subtractor circuits 121 and 123, respectively. If $G_3$ is "1", the adder/subtractor circuit 121 adds; if $G_3$ is "0", the circuit 121 subtracts. Similarly, $G_4$ controls the adder/subtractor circuit 123. The output bits $G_1$ and $G_2$ are respectively AND'ed with the $C_1$ clock pulse in AND gates 127 and 129 to form strobe signals $S_1$ and $S_2$ which are applied to the adder/subtractor circuits 121 and 123, respectively. These strobe signals cause the adder/subtractor circuits 121 and 123 to add or subtract the data from the output multiplexer 109 from the contents of the associated registers 113 and 115 in accordance with the binary states of the control bits $G_3$ and $G_4$ discussed above. Therefore, when either (or both) of the strobe pulses $S_1$ and $S_2$ is not supplied (e.g. $S_1$ = 0), the output from the multiplexer 109 is ignored by the associated adder/subtractor circuit (e.g. 121).

When the 8 angles for an 8 × 8 bit window have been accumulated in the registers 113 and 115, the $C_2$ clock enables each of the registers 113 and 115 to output the five most significant bits (5 MSB's) of the accumulated data in each register. The five most significant bits of each of the registers 113 and 115 are combined into a 10-bit address that is applied to a ROM 131. The ROM 131 is programmed to store 1024 8-bit words. Basically, the function of the ROM 131 is to perform an approximate table look-up arc-tangent calculation. The contents of a particular location in the ROM 131 comprises the ridge flow angle associated with the 10-bit address defined by the 5-bit sine and 5-bit cosine projections developed at the outputs of the registers 113 and 115. The $C_2$ clock, which caused the registers 113 and 115 to develop the 10-bit address for the ROM 131, is also used to reset the registers 113 and 115 to be ready for the processing of the data in the next 8 × 8 bit window.

The 8-bit flow angle data from the ROM 131 is stored in an 8-bit holding register 133 which, in turn, applies the 8-bit flow angle data to the input of a 32 × 8 bit ridge direction RAM 135. The D signals ($D_3$–$D_7$), that identify which one of the 32 8 × 8 windows is being processed at that time, are used to address the RAM 135. When the $C_2$ and $C_5$ clocks are both in a binary "1" state, an AND gate 137 develops a signal to enable the RAM to write or store the 8-bit flow angle data in the address location indicated by the D address.

The associated "minutia detected" signal (from the minutia position detector 23 of FIG. 1) enables the flow angle data that is stored in the D-addressed location of the RAM 135 to be read out and latched into a $\theta$ register 139. The output of the $\theta$ register 139 is the orientation angle $\theta_M$ of the detected minutia. Thus, the $X_M$, $Y_M$ and $\theta_M$ coordinates of a detected minutia are respectively developed at the outputs of the registers 67 and 69 (of FIG. 3) and 139 (of FIG. 5B).

The invention thus provides a binary image minutiae detector wherein, in a preferred embodiment, a two-dimensional binary data bit stream of an image is enhanced in an enhancement circuit by pore-fill and line-thin operations. The enhanced binary data bit stream is then applied in parallel to first and second detectors which detect minutiae and extract the X, Y and $\theta$ coordinates of each minutia detected in the enhanced binary data bit stream.

While the salient features have been illustrated and described in a preferred embodiment of the invention, it should be readily apparent to those skilled in the art that many changes and modifications can be made in the preferred embodiment without departing from the spirit and scope of the invention. It is therefore intended to cover all such changes and modifications of the invention that fall within the spirit and scope of the invention as set forth in the appended claims.

We claim:

1. A machine method for detecting minutiae in two-dimensional binary data derived from a pattern image, said method comprising the steps of:
    enhancing the binary data;
    detecting the relative positions of minutiae in the enhanced binary data as a function of the relative locations of first preselected patterns of data in the enhanced binary data;
    identifying ridge angle flow lines in the enhanced binary data as a function of the detection of second preselected patterns in the enhanced binary data;
    determining the vector average of the ridge angle flow lines for each of a plurality of predetermined areas of the two-dimensional enhanced binary data in order to identify the orientation angle common to all of the minutiae detected in each said predetermined area; and
    correlating the vector average of the ridge angle flow lines with the relative positions of minutiae in each corresponding predetermined area to derive the same relative orientation angle for each of the relative positions of minutiae in that corresponding predetermined area.

2. A machine method for detecting minutiae in a fingerprint comprising the steps of:
    converting the fingerprint into two-dimensional binary data;
    enhancing the binary data;
    detecting the relative positions of minutiae in the enhanced binary data as a function of the relative locations of first preselected patterns of data in the enhanced binary data;
    identifying ridge angle flow lines in the enhanced binary data as a function of the detection of second preselected patterns in the enhanced binary data;
    determining the vector average of the ridge angle flow lines for each of a plurality of predetermined areas of the two-dimensional enhanced binary data in order to identify the orientation angle common to all of the minutiae detected in each said predetermined area; and
    correlating the vector average of the ridge angle flow lines with the relative positions of minutiae in each corresponding predetermined area to derive the same relative orientation angle for each of the relative positions of minutiae in that corresponding predetermined area.

3. A minutiae detector comprising:
    a first circuit responsive to a two-dimensional binary data bit stream of an image of a pattern for developing an enhanced binary data bit stream therefrom;
    first means for generating a first signal to indicate the detection of a minutia when any of a first plurality of preselected patterns is present in the enhanced binary data bit stream;
    second means responsive to the first signal for generating position information signals indicative of the relative position of a detected minutia;
    third means for identifying ridge flow angles in the enhanced binary data bit stream as a function of the detection of second preselected patterns in the enhanced binary data bit stream;
    fourth means for generating the orientation angle common to all of the detected minutiae in each one of a plurality of predetermined areas of the two-dimensional enhanced binary data bit stream by determining the vector average of the ridge flow angles for each of said predetermined areas; and
    fifth means for correlating the vector average of the ridge flow angles with the position information signals of detected minutiae in each corresponding predetermined area to derive the same relative orientation angle for the position information signals of each of the minutiae detected in that corresponding predetermined area.

4. An apparatus for detecting minutiae in a fingerprint image, said apparatus comprising:
    first means for converting the fingerprint image into a two-dimensional binary data bit stream;
    second means for enhancing the binary data bit stream;
    third means responsive to the presence of first preselected patterns of data in the enhanced binary data bit stream for detecting minutiae and the relative positions of the detected minutiae;
    fourth means responsive to the presence of second preselected patterns of data in the enhanced binary data bit stream for determining ridge flow angles in the enhanced binary data bit stream;
    fifth means for generating the orientation angle common to all of the detected minutiae in each of predetermined areas of the two-dimensional enhanced binary data bit stream by determining the vector average of the ridge flow angles for each of said predetermined areas; and sixth means for correlating the vector average of the ridge flow angles with the detected relative positions of minutiae in each corresponding predetermined area to derive the same relative orientation angle for each of the detected relative positions of minutiae in that corresponding predetermined area.

5. The apparatus of claim 4 wherein said third means comprises:

seventh means for generating a first signal indicative of the detection of a minutia when one of the first preselected patterns is detected in the enhanced binary data bit stream; and eighth means responsive to the first signal for generating position information indicative of the relative position of an associated detected minutia.

6. An apparatus comprising:

means for converting a two-dimensional image of a pattern into two-dimensional binary data;

means for enhancing the binary data;

means for detecting the relative positions of minutia in the enhanced binary data as a function of the relative locations of first preselected patterns of data in the enhanced binary data;

means for identifying ridge angle flow lines in the enhanced binary data as a function of the detection of second preselected patterns of data in the enhanced binary data;

means for automatically generating the orientation angle common to all of the detected minutiae in each of a plurality of predetermined areas of the two-dimensional enhanced binary data by determining the vector average of the ridge angle flow lines for each of said predetermined areas; and means for correlating the vector average of the ridge angle flow lines with the detected relative positions of minutiae in each corresponding predetermined area to derive the same relative orientation angle for each of the detected relative positions of minutiae in that corresponding predetermined area.

* * * * *